(12) United States Patent
Gabriel et al.

(10) Patent No.: US 8,511,961 B2
(45) Date of Patent: Aug. 20, 2013

(54) FASTENER AND METHOD OF PROLONGING USE OF A DRIVER BLADE IN A FASTENING TOOL

(75) Inventors: William L. Gabriel, Barrington, IL (US); Christopher A. Horst, Antioch, IL (US); Donald E. Bergstrom, Lindenhurst, IL (US)

(73) Assignee: Illinois Tool Works Inc., Glenview, IL (US)

( * ) Notice: Subject to any disclaimer, the term of this patent is extended or adjusted under 35 U.S.C. 154(b) by 415 days.

(21) Appl. No.: 12/881,973

(22) Filed: Sep. 14, 2010

(65) Prior Publication Data

US 2011/0081220 A1 Apr. 7, 2011

Related U.S. Application Data

(60) Provisional application No. 61/248,292, filed on Oct. 2, 2009.

(51) Int. Cl.
*A43B 23/20* (2006.01)

(52) U.S. Cl.
USPC ........... 411/439; 411/82.2; 411/453; 411/914

(58) Field of Classification Search
USPC ............... 411/82, 82.1, 82.2, 439, 914, 428, 411/453, 473; 72/42
See application file for complete search history.

(56) References Cited

U.S. PATENT DOCUMENTS

| | | | |
|---|---|---|---|
| 3,129,642 | A | 4/1964 | Sorensen et al. |
| 4,519,175 | A | 5/1985 | Resan |
| 5,214,987 | A | 6/1993 | Fenton |
| RE37,615 | E | 4/2002 | Niese |
| 6,672,498 | B2 | 1/2004 | White et al. |
| 7,395,925 | B2 | 7/2008 | Sutt, Jr. |
| 2009/0155020 | A1 | 6/2009 | Versino et al. |

FOREIGN PATENT DOCUMENTS

| | | |
|---|---|---|
| CA | 861873 A | 1/1971 |
| DE | 202006008314 U1 | 8/2007 |
| EP | 1589237 A1 | 10/2005 |
| EP | 2000680 A2 | 12/2008 |
| JP | 53104482 A | 9/1978 |

OTHER PUBLICATIONS

International Search Report and Written Opinion of the International Searching Authority (EPO) issued in connection with PCT/US2010/049776 on Jan. 12, 2011.

*Primary Examiner* — Roberta Delisle
(74) *Attorney, Agent, or Firm* — Levenfeld Pearlstein, LLC

(57) ABSTRACT

A fastener and a method for reducing wear on a driver blade in a fastening tool includes applying a layer of solid-based lubricant between the head of a fastener and a driver blade end. The fastener is for use in a fastening tool and includes a head, a shank, and a layer of lubricant on the head of the fastener. The lubricant is graphite, molybdenum disulfide, tungsten disulfide, boron nitride, polytetrafluoroethylene (PTFE), nano-diamonds, calcium stearate, sodium stearate, oils, greases, waxes, thermoplastic polymers, or another lubricant that exhibits similar characteristics. Aromatic polyamides (such as Kevlar™), ultra-high molecular weight polyethylene, powdered glass, glass fibers, thermoplastic polymers, and thermoset polymers also are contemplate to provide a barrier to contact between the driver blade and fastener head. The lubricant is sprayed, rolled, brushed, blotted or otherwise applied between the head of the fastener and the driver blade end prior to firing the fastening tool.

13 Claims, 1 Drawing Sheet

FASTENER AND METHOD OF PROLONGING USE OF A DRIVER BLADE IN A FASTENING TOOL

CROSS-REFERENCE TO RELATED APPLICATION DATA

The present application claims the benefit of priority of Provisional U.S. Patent application Ser. No. 61/248,292, filed Oct. 2, 2009.

BACKGROUND OF THE INVENTION

The present invention is directed to a fastener. More particularly, the present invention pertains to a friction reducing coating or barrier between a fastener and a driver blade of a fastener tool.

Nailers and related fastening tools are well known in the art. Such tools are used in driving fasteners into workpieces. Such fastening tools may be, for example, pneumatic or combustion-powered driving tools for driving nails, staples, and other fasteners.

In fastening tools, such as pneumatic fastening tools, a driver blade is secured to a piston and reciprocates with the piston in a cylinder of the tool for driving fasteners into workpieces. Driver blades may be solid or hollow, and the driving surface may be of various shapes such as circular, rectangular, crescent, and other shapes. Generally, however, a driver blade for use in a fastener-driving tool includes an elongated solid body having a first end and a driving end. The first end is operably connected to a piston, and the driving end, having a substantially solid cross-section, contacts the fastener head when the tool is fired.

Fasteners, such as screws, nails, or staples, are positioned within the tool and with each firing, the driver blade contacts and forces individual fasteners out of the tool into the workpiece. The driver blade, in general, follows the fastener head in the cylinder within the tool, to the nose of the tool, and for a distance beyond the nose such that the driver blade is in contact with the fastener head for a period of time during firing. Unfortunately, because of the duration of contact and the amount of friction with the heads of the fasteners, the driver blade can become worn down or shortened after repeated use and must be replaced.

The driver blade may slip off of the head of the fastener as the nail is driven due to the angle of collation and tool recall, which subsequently wears the edge of the blade nearest the next fastener to be driven. As the driver blade wears in these instances, it reduces control of the nail. The nails may bend over when driven because of wear on the edges of the blade causing the blade to slide off the nail head.

Shortening of the driver blade is even more noticeable when the fastener is of the type which rotates as it is driven. The torsion or twisting forces amplify wear on the driver blade, as the fastener rotates at a high rate relative to the driver blade. Even after firing only a few fasteners, for example, driver blades can exhibit visual indication of wear on the driving end. At times, especially when fired into very dense substrates such as engineered or composite lumber, the nail head may have burn marks after firing when the fasteners rotate while being driven. These burn marks are indicative of the extreme frictional forces generated when driving a rotatable fastener into a workpiece that is more resistant to fastener penetration.

In addition, the driver blade may not wear down evenly; the driving end may wear down unevenly or in a lopsided fashion and cause the driver blade to impact the fastener head at a skewed angle or fail to fully seat the fastener. Such uneven wear of the driver blade may require a user of rotatable fasteners to replace the driver blade more frequently than a user of non-rotatable fasteners. Rotatable fasteners include fasteners in which at least a portion of the shank has a spiral geometry, such as a spiral shank fastener. Having to repeatedly replace a driver blade while at a work site can be time consuming and can increase labor costs and/or down-time.

The issue of driver blade wear is not widely addressed, and the few solutions that do exist involve using carbide-tipped driver blades. Even carbide tipped driver blades, however, may exhibit signs of wear when used to drive rotatable fasteners into very dense substrates.

It is well known in the art to coat the shank of the fastener with a lubricant to facilitate penetration of the fastener into the wood, and increase resistance to withdrawal of the fastener from the substrate. Such a lubricant is generally of the type that melts when exposed to high impact due to heat generated from friction, and quickly cools to serve as an adhesive after introduction into the substrate. Fastener shanks can be dipped or coated in polymeric material to ease or reduce the force necessary to penetrate the substrate.

However, lubricating the shank of the fastener does not sufficiently alleviate issues associated with driver blade end wear. In addition, while the types of lubricants used to coat a fastener shank, such as acrylics, facilitate penetration of the fastener into the wood and increase resistance to withdrawal of the fastener from the substrate, these are not as effective to reduce driver blade end wear.

Accordingly, there is a need for an apparatus and method that prevents or slows wear of a fastening tool driver blade. Such a solution would be economical and easy to administer or use without increasing worksite labor or time.

BRIEF SUMMARY OF THE INVENTION

In accordance with fasteners consistent with the present invention, a fastener is provided that includes a lubricant, such as graphite, applied to a head of the fastener. The lubricant may include one or more materials that are suitable to reduce wear on the driver blade when the fastener is driven into a substrate. The lubricant may be a solid, or a combination of liquid and solid lubricants. For example, the lubricant may be a dry film lubricant containing a mixture of solid lubricants and a binder. The fastener may be a rotatable fastener or a non-rotatable fastener.

The lubricant may include, for example, graphite, molybdenum disulfide, tungsten disulfide, boron nitride, polytetrafluoroethylene (PTFE), nanodiamonds, stearate salts, thermoplastic polymers, and other lubricants that exhibit similar characteristics. Other materials not typically utilized for lubrication, such as aromatic polyamides (such as Kevlar™), ultra-high molecular weight polyethylene, powdered glass, glass fibers, and thermoset polymers, also are contemplated to provide a barrier to contact between the driver blade and fastener head.

The lubricants may be held together with a binder, including, for example, thermoplastic polymers, thermoset polymers, clays, adhesives, sodium silicate, and starches. Further, the lubricant may comprise one or more liquid lubricants, such as oils, petroleum products, greases, and fatty acid derivatives, combined with one or more solid lubricants, which may be held together with a binder.

In one embodiment, a lubricant is applied to the top surface of the fastener head and has a suitable thickness to effectively reduce wear on the driver blade. The lubricant generally adheres to the head of the fastener, and it may transfer from the surface of the fastener while in contact with the driver blade Such a coating not only reduces wear on the driver blade, it also increases the efficiency of the fastening tool. The coating also reduces the power or force required by the fastening tool to drive the fastener in the workpiece. In one illustrative example of a graphite lubricant on a fastener, such a lubricant was found to reduce the tool pressure and resulting force required to drive the fastener by at least four (4) pounds per square inch (psi). For reference, such tools typically operate at pressures up to about 120 psi.

In another embodiment, the entire fastener, and in particular the head of the fastener, is coated with the lubricant. In another embodiment, a lubricant is disposed on the shank that is different from the lubricant disposed on the top surface of the head of the fastener. In another embodiment, a lubricant film or mist may be positioned or applied between the fastener head and the driving end of the driver blade. The lubricant mist or film increases the efficiency of the fastening tool, reduces wear on the driver blade, and reduces the power or force required by the fastening tool to drive the fastener into the workpiece.

In another embodiment, the driver blade of the fastening tool is coated with the lubricant in order to provide a barrier between the fastener head and the driver blade driving end. In each of these embodiments, a lubricating barrier is formed between the fastener head and the driving end of a driver blade in a fastening tool.

Also in accordance with methods consistent with the present invention, a method is provided for prolonging the life of a driver blade of a fastening tool. The method includes applying to the head of a fastener a lubricant, such as graphite, prior to firing the tool. The lubricant is dried, forming a dry film of lubricant on the fastener head. The lubricant may be dried using heat or evaporation or the lubricant may be applied to a heated fastener head surface. The lubricant may be applied to the fastener head by spraying, rolling, blotting or other methods.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
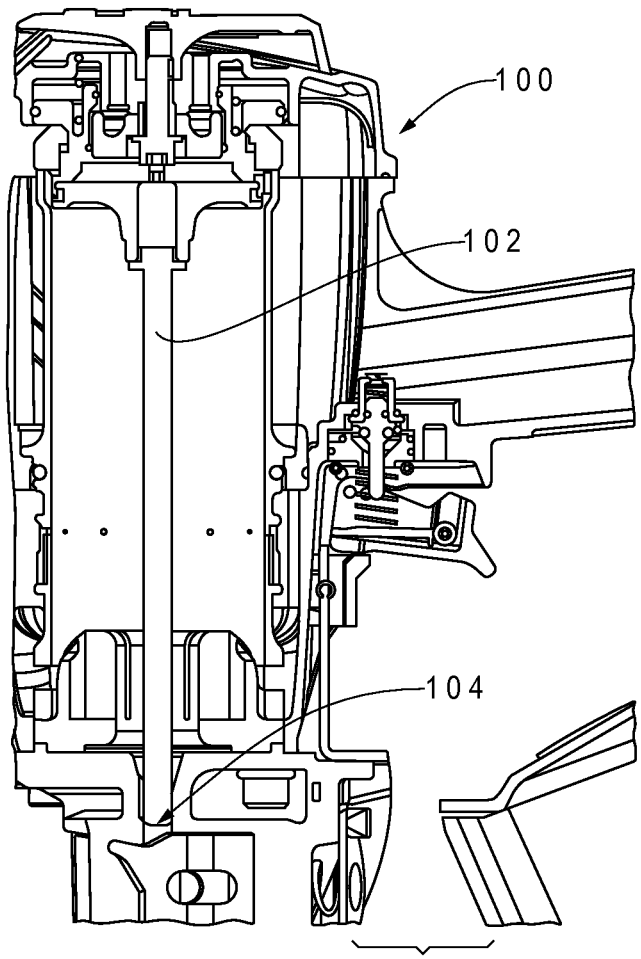
FIG. 1 is a sectional view of a fastening tool showing a driver blade.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

In accordance with fasteners consistent with the present invention, a fastener is provided that includes a lubricant, such as graphite, applied to a head of the fastener. The fastener may be a rotatable fastener or a non-rotatable fastener. The lubricant may include one or more materials that are suitable to reduce wear on the driver blade when the fastener is driven. The lubricant may be a solid, or a combination of liquid and solid lubricants. For example, the lubricant may be a dry film lubricant containing a mixture of solid and liquid lubricants and the binder.

The lubricant may include, for example, graphite, molybdenum disulfide, tungsten disulphide, boron nitride, polytetrafluoroethylene (PTFE), nanodiamonds, stearate salts, oils, greases, thermoplastic polymers, and other lubricants that exhibit similar characteristics. Other materials not typically utilized for lubrication, such as aromatic polyamides (such as Kevlar™), ultra-high molecular weight polyethylene, powdered glass, glass fibers, and thermoset polymers, are also contemplated to provide a barrier to contact between the driver blade and fastener head.

The lubricants may be held together with a binder, including, for example, thermoplastic polymers, thermoset polymers, clays, adhesives, waxes, sodium silicate, and starches. Further, the lubricant may comprise one or more liquid lubricants, such as oils, petroleum products, greases, and fatty acid derivatives, combined with one or more solid lubricants, which may be held together with a binder.

In one embodiment, a lubricant is applied to the fastener head and has a suitable thickness to effectively reduce wear on the driver blade. In one embodiment, the thickness of the lubricant is twenty-five (25) microns or less. The lubricant generally adheres to the head of the fastener, and it may transfer from the surface of the fastener while in contact with the driver blade. Such a coating of lubricant not only reduces wear on the driver blade, it also increases the efficiency of the fastening tool. The coating of lubricant also reduces the power or force required by the fastening tool to drive the fastener in the workpiece. In one illustrative example, a graphite-based lubricant disposed on a fastener was found to reduce the tool pressure and force required to drive the fastener by at least four (4) pounds per square inch (psi). Such tools typically operate at pressures up to about 120 psi.

In another embodiment, the entire fastener, and in particular the head of the fastener, is coated with the lubricant. In another embodiment, the lubricant is disposed on the shank that is different from the lubricant disposed on the top surface of the head of the fastener.

In another embodiment, the lubricant in the form of a film or mist, may be positioned or applied between the fastener head and the driving end of the driver blade. The lubricant mist or film increases the efficiency of the fastening tool, reduces wear on the driver blade, and reduces the power or force required by the fastening tool to drive the fastener into the workpiece.

In another embodiment, the driver blade of the fastening tool is coated with the lubricant in order to provide a barrier between the fastener head and the driver blade driving end. In each of these embodiments, a solid-based lubricating barrier is formed between the fastener head and the driving end of a driver blade in a fastening tool.

Such use of lubricant on or in conjunction with a fastener is counter-intuitive; it is expected that such use might cause the driver blade end to slip or misalign with the fastener head. Thus, the advantages of using the lubricant in such a manner are unexpected.

In accordance with methods consistent with the present invention, a method is provided for prolonging the life of a driver blade of a fastening tool. The method includes applying to the head of a fastener a lubricant, such as graphite, prior to firing the tool. The lubricant is dried, forming a dry film of lubricant on the fastener head. The lubricant may be dried using heat or evaporation or the lubricant may be applied to a heated fastener head surface. The lubricant may be applied to the fastener head by spraying, rolling, brushing, and/or blotting.

Referring now to the figures and in particular to FIG. 1, there is shown a fastening tool 100 having a driver blade 102. When the fastening tool 100 fires, the driver blade 102 bears down on a fastener and follows the fastener through the cylindrical drive chamber. When the fastener is of the type that rotates, the continuous rotation of the fastener head against the driver blade driving end 104 causes the driver blade to wear down and shorten or decrease in length.

As discussed above, to prevent wear on the driver blade, and to increase tool efficiency, a lubricant, such as graphite, is disposed between the head of the fasteners to be used in the fastening tool and the driver blade of the fastening tool. Thus, in accordance with fasteners and methods consistent with the present invention, the head of the fastener is coated with a lubricant to effectively minimize frictional forces between the driver blade of the fastening tool and the head of the fastener. Such a fastener is illustrated in FIG. 2.

Figure 2:
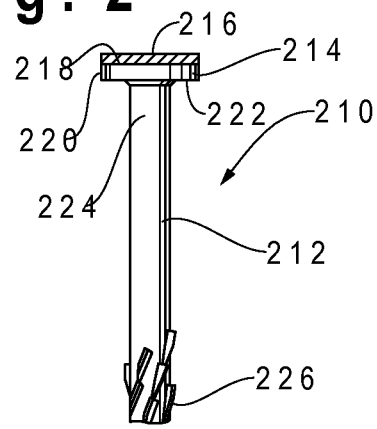
FIG. 2 is a side view of a fastener having a lubricant coated head in accordance with the principles of the present invention.

In FIG. 2, there is shown an illustrative rotatable fastener 210, such as a fastener that includes helical fluting or threads 226 on its shank 212 to effect rotation of the fastener as the fastener is driven into a substrate. The fastener 210 has a shank 212 and a head 214. The fastener 210 may be any type of rotatable fastener or fastener that rotates as it is driven into the substrate, such as is disclosed in U.S. Pub. No. 2009/0155020, commonly assigned with the present invention and incorporated herein by reference. At least one layer of solid-based lubricant 216 is applied to the fastener head 214, and covers at least a portion of the top surface 218 of the fastener head, and may cover at least a portion of the side 220 and bottom 222 surfaces of the fastener head. It is contemplated that the thickness of the solid-based lubricant may vary and one or more layers may be applied.

Figure 2A:
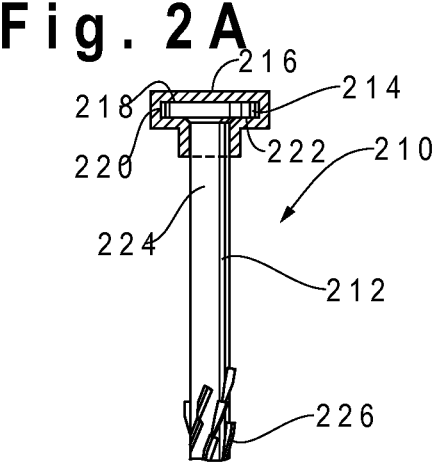
FIG. 2A is a side view, similar to FIG. 2, showing a fastener having a lubricant coating on the entire head and a portion of the shank.

As seen in FIG. 2A, in an embodiment of the fastener 210, the lubricant 216 coats the top surface 218 of the fastener head 214, a periphery or side 220 of the fastener head 214, and a second or bottom surface 222 of the fastener head 214. In addition, a top portion of the shank shown generally at 224, may be coated. In a preferred embodiment, only the top surface 218 of the fastener head is coated with the lubricant.

The lubricant 216 acts as a high pressure lubricant. The lubricant may include, for example, one or more lubricants such as graphite, molybdenum disulfide, tungsten disulphide, boron nitride, polytetrafluoroethylene (PTFE), nano-diamonds, stearate salts, oils, greases, thermoplastic polymers, and other lubricants that exhibit similar characteristics. Other materials not typically utilized for lubrication, such as aromatic polyamides, UHMWPE, powdered glass, glass fibers, thermoplastic polymers, and thermoset polymers, also fall within the scope and spirit of the invention by providing a barrier to contact between the driver blade and fastener head.

The lubricant may be formulated with a binder, including, for example, thermoplastic polymers, thermoset polymers, clays, adhesives, sodium silicate, and starches. Further, as described above, the lubricant may include one or more liquid lubricants, such as oils, petroleum products, greases, and fatty acid derivatives, combined with one or more solid lubricants, which may be held together with a binder. In one embodiment, a lubricant includes graphite and the binder in an approximate ratio of 3:1 by weight. Such a solid-based lubricant may be prepared in a dispersion that may also include liquid components to facilitate application or bonding to the fastener head, such as acetone and isopropanol.

A comparison of an embodiment of a fastener in accordance with the present invention to other fasteners illustrates the advantages of the present fastener and a method of reducing driver end wear. In a first sample, a group of fasteners, made from drawn steel wire and having no head coating, was used as a control group to compare various lubricant formulas. A group of fasteners having a graphite coating applied to the fastener head comprised a second group. A third group of fasteners included a thermoplastic lubricant on the fastener heads, wherein the lubricant included a polymer that melts under high pressure and heat from friction, such as a polymeric resin. A group of fasteners having a coating including boron nitride and a urethane binder applied to the fastener heads includes a fourth group. The tips of the shanks of all the fasteners were coated with a polymeric material that reduces the force required to drive the fastener into a workpiece.

The same fastening tool was used to fire each of the fastener groups. Fasteners from each group were driven into two (2) layers of 0.75 inch thick medium density fiberboard (MDF) over one (1) layer of spruce, pine, fir (SPF) species 2×4 ("the workpiece") at 110 psi.

Upon visual inspection, over half of the fasteners of the control group exhibited signs of burn or discoloration due to friction/heat. Neither the graphite coating group, the thermoplastic coating group, nor the boron nitride group exhibited visual signs of burn or discoloration.

In a second sample, fasteners from the graphite coating group and the control group were rapidly fired into another workpiece and infrared images of the fastener heads were immediately recorded. The graphite coated head reduced the temperature of the fired fastener, as measured at the head of the fastener, by an average of twenty-two (22) degrees total more than the control group while the thermoplastic coated group reduced the temperature of the fired fastener by an average of eleven (11) degrees. Readings indicated that the temperature of the control group after firing averaged 131° F., while the graphite coated group and the thermoplastic coated group averaged 109° F. and 120° F. respectively.

Figure 3:
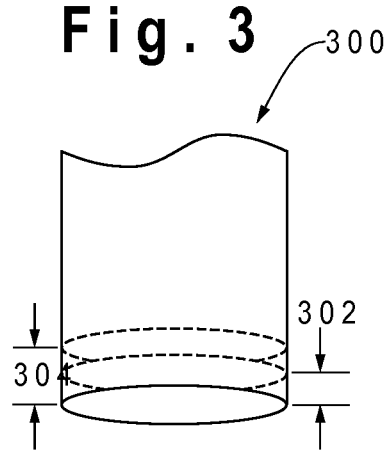
FIG. 3 is a perspective illustration of a driver end blade after use with uncoated fasteners.
Figure 4:
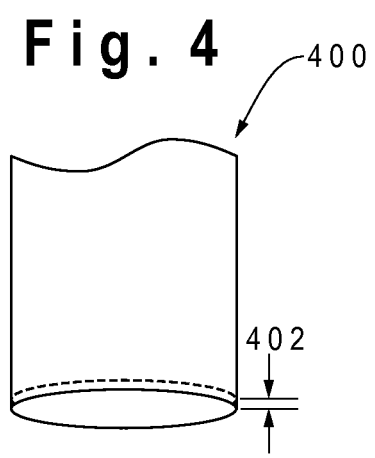
FIG. 4 is a perspective illustration of another driver end blade after use with coated fasteners.

In a third sample, driver blade wear was examined. Using a new driver blade for each group, approximately 1000 fasteners from the each group were fired from the same fastening tool. The driver blade lengths were measured both before and after the firing. The results are depicted in FIGS. 3 and 4.

The driver blade that was used to drive the control group, depicted as blade 300, exhibited at least $10/1000$ inch (10 mil) decrease in length (shown at 302). This decrease in length also appeared to be a linear phenomenon. For example, after firing 2000 fasteners, the decrease in length appeared to be about $20/1000$ inch (20 mil, shown at 304). The driver blade that was used to drive 1000 fasteners having the thermoplastic coated head exhibited approximately $2/1000$ inch (2 mil) decrease in length.

In contrast, the driver blade that was used to drive the fasteners having the graphite coated heads (depicted as blade 400) exhibited negligible or no decrease in length. The same driver blade was then subsequently used to fire several more rounds of fasteners with graphite coated heads. After 100,000 fasteners had been driven, measurements were again taken and again the driver blade showed only 3/1000 inch (3 mil) to 4/1000 inch (4 mil) decrease in length, shown generally at 402. The driver blade that was used to drive the fasteners having the boron nitride coated heads also exhibited negligible or no decrease in length after firing 1000 fasteners and after firing 5000 fasteners.

The advantages of the present coated fastener and method will be appreciated by those with skill in the art. The lubricant barrier between the driver end blade and the fastener increases the efficiency of the fastening tool and significantly decreases driver end blade wear. Lubricants as described above provide more efficient energy transfer to the fastener than non-coated fasteners. As such, the force or power required by the fastening tool to drive the coated-head fastener is less than the force required by a fastening tool to drive a fastener without such a head coating. In one sample, the tool setting was four (4) psi less to drive a coated head fastener, than a non-coated fastener, to the same depth, in the same workpiece. The increase in tool efficiency is realized by a more efficient transfer of linear energy to rotational energy during the drive process. Less energy is lost to heat, torsional resistance, and frictional forces.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. An impact driven fastener having a coated head for use in a fastener driving tool having a reciprocating driver blade, the fastener comprising:
   a head having a top surface;
   a shank having a helical thread thereon such that the fastener rotates when impacted by the driver blade, as the fastener is driven into a substrate; and
   a layer of solid-based lubricant disposed on the top surface of the head of the fastener where the top surface of the head of the fastener is contacted by the driver blade, to reduce friction between the reciprocating driver blade and the rotating fastener.

2. The fastener in accordance with claim 1 wherein a lubricant is disposed on the shank and wherein the lubricant disposed on the shank is different from the solid-based lubricant disposed on the top surface of the head of the fastener.

3. The fastener in accordance with claim 1 wherein the solid-based lubricant generally adheres to the head of the fastener.

4. The fastener in accordance with claim 1 wherein the solid-based lubricant has a thickness of about twenty-five (25) microns or less.

5. The fastener in accordance with claim 1 wherein the solid-based lubricant is a dry film lubricant containing a mixture of at least one solid lubricant and a binder.

6. The fastener in accordance with claim 5 wherein the binder is at least one of a thermoplastic polymer, a thermoset polymer, a clay, an adhesive, sodium silicate, a wax, and a starch.

7. The fastener in accordance with claim 1 wherein the solid-based lubricant includes at least one of molybdenum disulfide, tungsten disulfide, boron nitride, polytetrafluoroethylene (PTFE), nanodiamonds, stearate salts, aromatic polyamides, ultra-high molecular weight polyethylene (UHMWPE), powdered glass, glass fibers, wax, thermoset polymers, and thermoplastic polymers.

8. The fastener in accordance with claim 1 wherein the solid-based lubricant includes one or more liquid lubricants, such as oils, petroleum products, greases, and fatty acid derivatives with a solid binder.

9. A method of manufacturing a friction reducing fastener for use in a fastener tool comprising:
   applying a solid-based lubricant to a top surface of a head of the fastener; and
   drying the lubricant such that the lubricant forms a dry film on the top surface of the head of the fastener.

10. The method in accordance with claim 9 wherein the solid-based lubricant includes at least one of molybdenum disulfide, tungsten disulfide, boron nitride, polytetrafluoroethylene (PTFE), nanodiamonds, stearate salts, aromatic polyamides, ultra-high molecular weight polyethylene (UHMWPE), powdered glass, glass fibers, wax, thermoset polymers, and thermoplastic polymers.

11. The method in accordance with claim 9 wherein drying or curing the solid-based lubricant includes applying heat to the solid-based lubricant.

12. The method in accordance with claim 9 wherein the solid-based lubricant is applied by one of spraying, rolling, brushing, and blotting the solid-based lubricant onto the head of the fastener.

13. A method for reducing wear on a driver blade in a fastening tool, the method comprising:
   applying a layer of lubricant between a head of a fastener to be used in the fastening tool and an end of a driver blade, wherein the lubricant is one of graphite, molybdenum disulfide, tungsten disulfide, boron nitride, polytetrafluoroethylene, nanodiamonds, stearate salts, aromatic polyamides, ultra-high molecular weight polyethylene (UHMWPE), powdered glass, glass fibers, wax, thermoset polymers, and thermoplastic polymers.

* * * * *